US010922807B2

(12) United States Patent
Moioli et al.

(10) Patent No.: US 10,922,807 B2
(45) Date of Patent: Feb. 16, 2021

(54) WAFER MANUFACTURING SYSTEM, DEVICE AND METHOD

(71) Applicant: STMICROELECTRONICS S.r.l., Agrate Brianza (IT)

(72) Inventors: Lidia Moioli, Albino (IT); Pasqualina Fragneto, Burago di Molgora (IT); Beatrice Rossi, Milan (IT); Diego Carrera, Lodi (IT); Giacomo Boracchi, Buccinasco (IT); Mauro Fumagalli, Camparada (IT); Elena Tagliabue, Caslino d'Erba (IT); Paolo Giugni, Milan (IT); Annalisa Aurigemma, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 61 days.

(21) Appl. No.: 16/174,022

(22) Filed: Oct. 29, 2018

(65) Prior Publication Data
US 2020/0134809 A1    Apr. 30, 2020

(51) Int. Cl.
G06T 7/00    (2017.01)

(52) U.S. Cl.
CPC .. *G06T 7/0006* (2013.01); *G06T 2207/20081* (2013.01); *G06T 2207/30148* (2013.01)

(58) Field of Classification Search
CPC ......... G06T 7/0006; G06T 2207/20081; G06T 2207/30148
USPC ...................................................... 382/149
See application file for complete search history.

(56) References Cited

U.S. PATENT DOCUMENTS

| 6,738,954 B1* | 5/2004 | Allen ............... G01R 31/31705 |
| | | 257/E21.525 |
| 9,739,783 B1* | 8/2017 | Kumar ............... G01N 33/6893 |
| 2014/0268105 A1* | 9/2014 | Bills .................... G03H 1/0443 |
| | | 356/51 |
| 2017/0328983 A1* | 11/2017 | Volgyesi ................... G01S 5/28 |
| 2018/0330493 A1* | 11/2018 | Milligan ................. G06T 7/001 |
| 2019/0005357 A1* | 1/2019 | Bhaviripudi ............. G06N 3/04 |

OTHER PUBLICATIONS

Hsu, "Clustering Ensemble for Identifying Defective Wafer Bin Map in Semiconductor Manufacturing," *Mathematical Problems in Engineering* 2015:707358, 2015. (12 pages).
Nakata et al., "A Comprehensive Big-Data-Based Monitoring System for Yield Enhancement in Semiconductor Manufacturing," *IEEE Transactions on Semiconductor Manufacturing* 30(4):339-344, 2017.
Wu et al., "Wafer Map Failure Pattern Recognition and Similarity Ranking for Large-Scale Data Sets," *IEEE Transactions on Semiconductor Manufacturing* 28(1):1-12, 2015.

* cited by examiner

*Primary Examiner* — Michael R Neff
(74) *Attorney, Agent, or Firm* — Seed IP Law Group LLP

(57) ABSTRACT

A device includes image generation circuitry and a convolutional neural network. The image generation circuitry, in operation, generates a binned representation of a wafer defect map (WDM). The convolutional-neural-network, in operation, generates and outputs an indication of a root cause of a defect associated with the WDM based on the binned representation of the WDM and a data-driven model associating WDMs with classes of a defined set of classes of wafer defects.

31 Claims, 10 Drawing Sheets

WAFER MANUFACTURING SYSTEM, DEVICE AND METHOD

BACKGROUND

Technical Field

The following disclosure relates generally to wafer manufacturing systems, devices and methods.

Description of the Related Art

Semiconductor wafers are generally manufactured using production lines. Each semiconductor wafer may include a plurality of chips, which are separated or cut from one another as part of the production process. The wafers may include physical defects which may cause one or more chips of the wafer to fail. Defects may include voids, craters, protrusions, bridges, particles, etc.

During the production process, wafers may be inspected at various points of the process to look for physical defects and to assess production quality. A wafer defect map (WDM) may be generated based on the inspection. A wafer defect map may be a text file which includes the coordinates of defects.

Defects may have causes which result in patterns in a wafer defect map. For example, particles in a clean room may be considered to have a random cause and may result in defects uniformly distributed on a wafer. Defects also may have specific geometries, such as specific arrangements of defects on a wafer which are consistent with a particular cause. For example, a misalignment of a wafer in a particular step performed on a particular machine may result in a wafer defect map with a pattern consistent with the cause of the defect. For example, a pattern consistent with a scratch may indicate machine handling is the cause of the defect in the WDM. The wafer defect maps may be examined to determine causes of defects based on patterns in the wafer defect maps.

BRIEF SUMMARY

In an embodiment, a device comprises: image generation circuitry, which, in operation, generates a binned representation of a wafer defect map (WDM); and convolutional-neural-network (CNN) circuitry, which, in operation, generates and outputs an indication of a root cause of a defect associated with the WDM based on the binned representation of the WDM and a data-driven model associating WDMs with classes of a defined set of classes of wafer defects. In an embodiment, the CNN circuitry, in operation, generates a feature vector associated with the WDM based on the binned representation of the WDM and the data-driven model; and searches a root cause database based on the generated feature vector to generate the indication of the root cause of the defect associated with the WDM. In an embodiment, the root cause database stores feature vectors and associated labels and tags of WDMs of a set of training WDMs, a label identifies a class of the defined set of classes and a tag identifies a root cause of a defect. In an embodiment, a tag identifies a machine associated with the root cause. In an embodiment, a feature vector stored in the database is associated with one or more labels and one or more tags. In an embodiment, the searching comprises executing a k-nearest-neighbors search routine which searches one of a k-dimension tree and a fast library for approximate nearest neighbors (FLANN). In an embodiment, the CNN circuitry includes one or more layers which, in operation, enhance a contrast of the binned representation of the WDM. In an embodiment, the CNN circuitry includes one or more layers which, in operation, introduce a non-linearity. In an embodiment, the CNN circuitry includes one or more pooling layers. In an embodiment, the CNN circuitry includes one or more drop-out layers. In an embodiment, the CNN circuitry includes one or more fully connected layers. In an embodiment, the CNN circuitry includes an activation function, which, in operation, generates a label identifying a class of the defined set of classes associated with the WDM based on the feature vector and the data-driven model. In an embodiment, in a training mode of operation, the image generation circuitry generates a set of binned WDM representations based on a set of supervised WDMs; and the CNN circuitry generates the data-driven model associating WDMs with classes of the defined set of classes of wafer defects based on the set of binned WDM representations. In an embodiment, the image generation circuitry augments the set of supervised WDMs. In an embodiment, the image generation circuitry augments the set of supervised WDMs prior to generating the set of binned WDM representations. In an embodiment, the image generation circuitry applies a grayscale transform to the set of binned WDM representations. In an embodiment, in a training mode of operation, the image generation circuitry: parses a set of supervised WDMs; normalizes the parsed set of supervised WDMs, generating a normalized set of WDMs; augments the set of normalized WDMs, generating an augmented set of supervised WDMs; generates a set of binned WDM representations based on the augmented set of supervised WDMs; and applies a grayscale transform to the set of binned WDM representations, generating a set of grayscale WDM images; and the CNN circuitry generates the data-driven model associating WDMs with classes of the defined set of classes of wafer defects based on the set of grayscale WDM images. In an embodiment, the image generation circuitry, in operation, applies a grayscale transform to the binned representation of the wafer defect map. In an embodiment, the data driven model associates WDMs with root causes of wafer defects and the CNN circuitry includes an activation function, which, in operation, generates a label identifying a class of the defined set of classes associated with the WDM and a tag identifying a root cause associated with the WDM.

In an embodiment, a system comprises: one or more memories; and wafer-defect-map (WDM) classification circuitry coupled to the one or more memories, which, in operation, generates a binned representation of a WDM; and generates and outputs an indication of a root cause of a defect associated with the WDM based on the binned representation of the WDM and a data-driven model associating WDMs with classes of a defined set of classes of wafer defects. In an embodiment, the WDM classification circuitry, in operation, generates a feature vector associated with the WDM based on the binned representation of the wafer-defect map and the data-driven model; and searches a root cause database based on the generated feature vector to generate the indication of the root cause of the defect associated with the WDM. In an embodiment, root cause database stores feature vectors and associated labels and tags of WDMs of a set of training WDMs, a label identifies a class of the defined set of classes and a tag identifies a root cause of a defect. In an embodiment, in a training mode of operation, the WDM classification circuitry, generates a set of binned WDM representations based on a set of supervised WDMs; and generates the data-driven model associating WDMs with classes of the defined set of classes of wafer defects based on the set of binned WDM representations. In an embodiment, in a training mode of operation, the WDM classification circuitry: parses a set of supervised WDMs; normalizes the parsed set of supervised WDMs, generating a normalized set of WDMs; augments the set of normalized WDMs, generating an augmented set of supervised WDMs; generates a set of binned WDM representations based on the augmented set of supervised WDMs; applies a grayscale transform to the set of binned WDM representations, generating a set of grayscale WDM images; and generates the data-driven model associating WDMs with classes of the defined set of classes of wafer defects based on the set of grayscale WDM images. In an embodiment, the system comprises a wafer inspection station including one or more digital image sensors. In an embodiment, the system comprises: wafer-production control circuitry, which, in operation, generates one or more control signals to control a wafer-production system based on the indication of the root cause of the defect associated with the WDM.

In an embodiment, a system comprises: a wafer inspection station, which, in operation, generates a wafer defect map (WDM); and WDM classification circuitry, which, in operation, generates a binned representation of the WDM; and generates and outputs an indication of a root cause of a defect associated with the WDM based on the binned representation of the WDM and a data-driven model associating WDMs with classes of a defined set of classes of wafer defects. In an embodiment, the WDM classification circuitry, in operation, generates a feature vector associated with the WDM based on the binned representation of the wafer-defect map and the data-driven model; and searches a root cause database based on the generated feature vector to generate the indication of the root cause of the defect associated with the WDM. In an embodiment, the root cause database stores feature vectors and associated labels and tags of WDMs of a set of training WDMs, a label identifies a class of the defined set of classes and a tag identifies a root cause of a defect. In an embodiment, in a training mode of operation, the WDM classification circuitry, generates a set of binned WDM representations based on a set of supervised WDMs; and generates the data-driven model associating WDMs with classes of the defined set of classes of wafer defects based on the set of binned WDM representations. In an embodiment, in a training mode of operation, the WDM classification circuitry: parses a set of supervised WDMs; normalizes the parsed set of supervised WDMs, generating a normalized set of WDMs; augments the set of normalized WDMs, generating an augmented set of supervised WDMs; generates a set of binned WDM representations based on the augmented set of supervised WDMs; applies a grayscale transform to the set of binned WDM representations, generating a set of grayscale WDM images; and generates the data-driven model associating WDMs with classes of the defined set of classes of wafer defects based on the set of grayscale WDM images. In an embodiment, the wafer inspection station comprises one or more digital image sensors. In an embodiment, the system comprises: wafer-production control circuitry, which, in operation, generates one or more control signals to control a wafer-production system based on the indication of the root cause of the defect associated with the WDM.

In an embodiment, a method comprises: generating, using a wafer defect map (WDM) classification system, a binned representation of a WDM; and generating and outputting, using the WDM classification system, an indication of a root cause of a defect associated with the WDM based on the binned representation of the WDM and a data-driven model associating WDMs with classes of a defined set of classes of wafer defects. In an embodiment, the method comprises: generating a feature vector associated with the WDM based on the binned representation of the wafer-defect map and the data-driven model; and searching a root cause database based on the generated feature vector to generate the indication of the root cause of the defect associated with the WDM. In an embodiment, the root cause database stores feature vectors and associated labels and tags of WDMs of a set of training WDMs, a label identifies a class of the defined set of classes and a tag identifies a root cause of a defect. In an embodiment, the method comprises, in a training mode of operation of the WDM classification system, generating a set of binned WDM representations based on a set of supervised WDMs; and generating the data-driven model associating WDMs with classes of the defined set of classes of wafer defects based on the set of binned WDM representations.

In an embodiment, a non-transitory computer-readable medium's contents configure a wafer defect map (WDM) classification system to perform a method, the method comprising: generating a binned representation of a WDM; and generating and outputting an indication of a root cause of a defect associated with the WDM based on the binned representation of the WDM and a data-driven model associating WDMs with classes of a defined set of classes of wafer defects. In an embodiment, the method comprises: generating a feature vector associated with the WDM based on the binned representation of the wafer-defect map and the data-driven model; and searching a root cause database based on the generated feature vector to generate the indication of the root cause of the defect associated with the WDM. In an embodiment, the root cause database stores feature vectors and associated labels and tags of WDMs of a set of training WDMs, a label identifies a class of the defined set of classes and a tag identifies a root cause of a defect. In an embodiment, the method comprises, in a training mode of operation of the WDM classification system, generating a set of binned WDM representations based on a set of supervised WDMs; and generating the data-driven model associating WDMs with classes of the defined set of classes of wafer defects based on the set of binned WDM representations.

DETAILED DESCRIPTION

Figure 1:
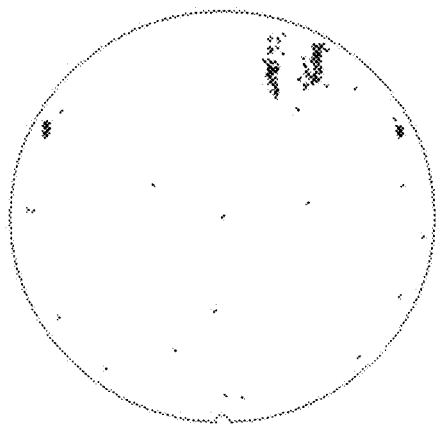
FIG. 1 depicts example wafer defect maps (WDMs).
Figure 1:
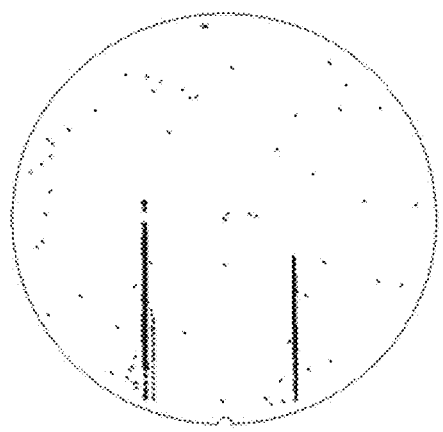
Figure 1:
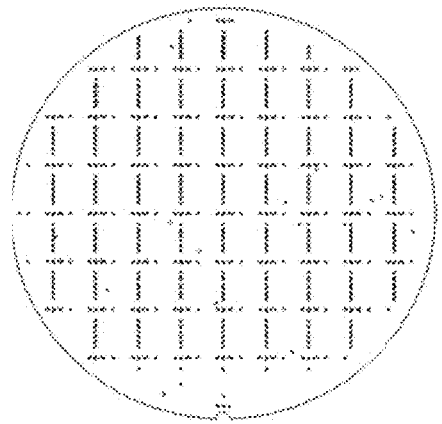

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, manufacturing of wafers, such as deposition steps, etching steps, separating steps, circuits, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

During a wafer manufacturing process, a statistically significant sampling of wafers may be performed at various steps of the process. For example, after each deposition, etching, stripping, cleaning, etc., process. Individual inspection stations may be added to the processing line to sample the wafers. The wafers may be manually examined using visual inspection. Wafer defect maps may be generated, for example, automatically, and operators may examine the wafer defect maps and consider additional production parameters.

FIG. 1 illustrates example WDMs having defect patterns consistent with various types of manufacturing problems, including, from top to bottom, a pattern presenting fingerprints consistent with a problem due to an incorrect manipulation by an operator, a pattern that has geometric scratches consistent with a problem due to loading or unloading problem with a machine (e.g., a machine handling error), and a pattern presenting a grid or checkboard pattern consistent with a problem during a lithography phase. From the type of pattern in the image, it may be possible to identify the kind of defect (e.g., a scratch), the involved equipment (the particular piece of machinery), the specific process (e.g., etching), and the root cause (e.g., misalignment).

Visual inspection and classification of defects using microscopes may be performed. Based on the inspection, further processing of a lot of wafers or of subsequent lots may be determined (e.g., dispose of a current lot, proceed with processing of the current lot without restriction, adjust processing of current and subsequent lots, etc., and various combinations thereof). A manual inspection process, however, may be time consuming, may have inconsistencies among operators, and inaccuracies due to human errors, subjectivity and fatigue.

An automated inspection system may generate a wafer defect map containing coordinates of each defect of a wafer die of the sampling. The defect map may take the form of a data file, such as a Klarf™ file. A WDM may include defect patterns, such as a specific spatial arrangement of defects within the wafer. The patterns may be analyzed to determine a root cause of a defect or defects within the wafer.

For example, clustering algorithms may be employed. Clusters of wafers may be created with maximize intraclass similarity and maximize interclass diversity. Clustering may be viewed as related to template matching. Disadvantages of a clustering approach include the creation of lots of clusters, and the lack of rotational invariance.

In another example, feature extraction with classification based on defined features extracted from the WDMs may be employed. A feature is a discriminative characteristic that a classifier can learn to distinguish WDMs. Features can be Radon-transform based features, Hough-transform based features, geometry-based features, etc. Public labeled data sets may be used for training a classifier. The features, however, are pre-defined, and new features are needed to add new classes.

Deep-learning techniques also may be employed. However, conventionally such techniques are bound to the dimensions of the WDMs, do not distinguish between multiple classes, and may employ thousands of failure patterns and causes. It also may be difficult to avoid distortions introduced by transformations, which may make it difficult to apply overcorrection avoidance techniques.

In addition, the automated approaches discussed above are processor intensive, which may mean these approaches are impractical to implement in real time during a wafer fabrication process.

In an embodiment, WDMs are generated from representative wafers (e.g., a statistically significant sampling) at various points during a wafer fabrication process. The WDMs are represented as image data and a deep neural network (DNN), such as a convolutional neural network (CNN), employs image classification techniques to identify root causes of defects associated with the wafers. The CNN classification techniques may be deep CNN classification techniques.

A CNN is a computational architecture that attempts to identify underlying relationships in a set of data by using a process that mimics the way the human brain operates. CNNs have the ability of adapting to changing inputs so that a network may produce a result without redesigning the output criteria. CNNs may be used, e.g., to extract patterns and detect trends that are too complex to be noticed by either humans or other computer techniques.

Figure 2:
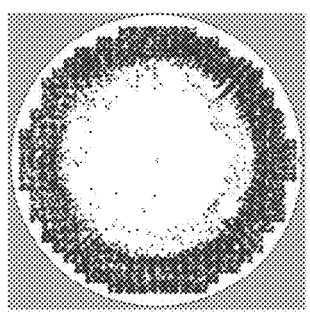
FIG. 2 depicts an example set of classes into which WDM maps may be classified.
Figure 2:
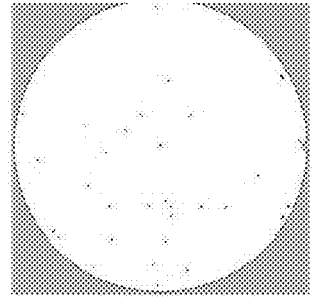
Figure 2:
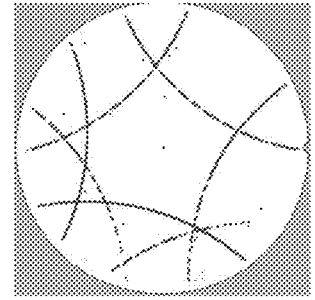
Figure 2:
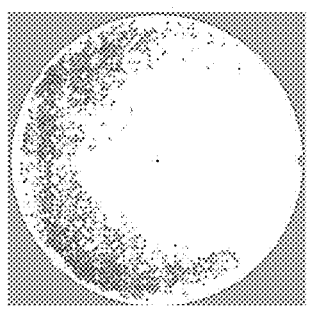
Figure 2:
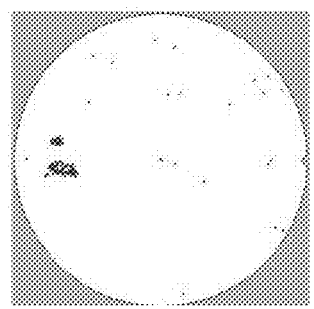
Figure 2:
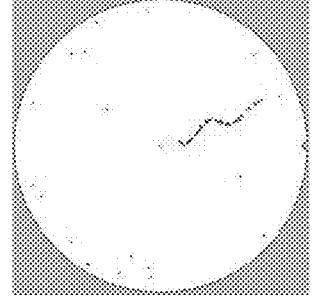
Figure 2:
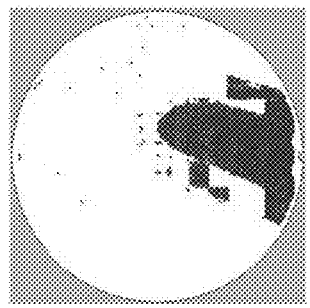
Figure 2:
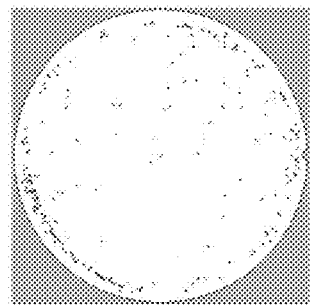
Figure 2:
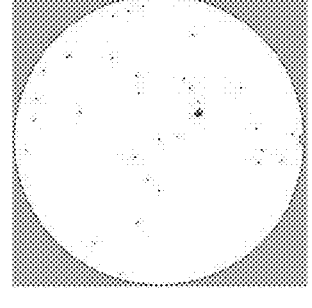
Figure 2:
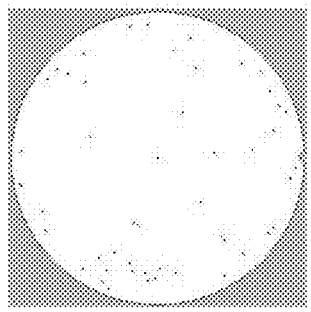
Figure 2:
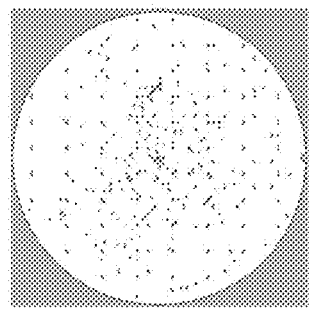
Figure 2:
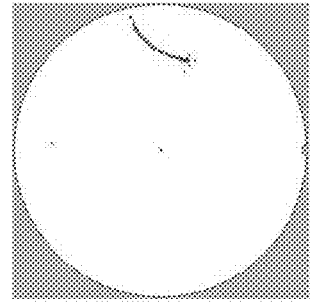

A training set of WDMs is provided which has labels and tags. FIG. 2 illustrates an embodiment of a set of defined classes into which WDMs may be classified. As illustrated, the set of classes comprises twelve defined classes including a normal class, a big cluster class, a half-moon class, a donut class, a grid class, a ring class, a fingerprints class, an incomplete class, a geometric scratch class, a small cluster class, a zig-zig class, and a basketball class. The labels identify a class of a defined class of WDM classes (e.g., one of the twelve classes of FIG. 2). The tags identify a root cause associated with WDM of the training set (e.g., a particular problem with a particular machine), and may include other information as well, such as identifiers of the machines used to process the wafer. The training set of WDMs may be augmented or oversampled to address imbalances in the number of samples of each class and overtraining issues. The WDMs are converted to images which are used to train the CNN. The CNN generates a data-driven model which matches an input WDM to a label corresponding to a class. In an embodiment, the training set also or instead trains the CNN to generate a data-driven model which matches an input WDM to a tag. A testing phase may be employed in which the CNN is tested with a new set of WDMs.

After the training (and testing), WDMs generated during a fabrication process are represented as image data and provided to the CNN. The data-driven model learned by the CNN is used to predict/identify defect root causes of defects associated with the WDMs generated during the fabrication process. For example, the CNN may predict a class (or a plurality of class) and a tag to associate with a WDM produced during a fabrication process using the trained model. In another example, the CNN may predict/identify a class (or a plurality of classes) to associate with a WDM generated during the fabrication process based on the trained model, and use a similarity test to associate a tag of a training WDM having the predicted class(es) which is most similar to the WDM generated during the fabrication process with the WDM generated during the fabrication process. Associating a tag of a most similar training WDM with a WDM generated during a fabrication process facilitates using tags which change after the training (e.g., as new machines are deployed), and avoiding problems which may arise in the generation of training data sets (e.g., only a few machines may generate defective WMDs, leading to a training set of tags which is too small).

The training process of a CNN, such as a deep CNN, to predict classes may produce a model which suffers from overfitting (e.g., the CNN learns from the training set so well that the CNN cannot generalize to new data), or from over-prediction of the majority class (e.g., the CNN is more likely to predict the majority class and yet maintain a high accuracy rate). In addition, representing the WDMs as images can result in large data files (e.g., 20,000 by 20,000 pixel images), which may be difficult to analyze using an CNN. Embodiments may employ various techniques to address or reduce the impact of such issues.

Figure 3:
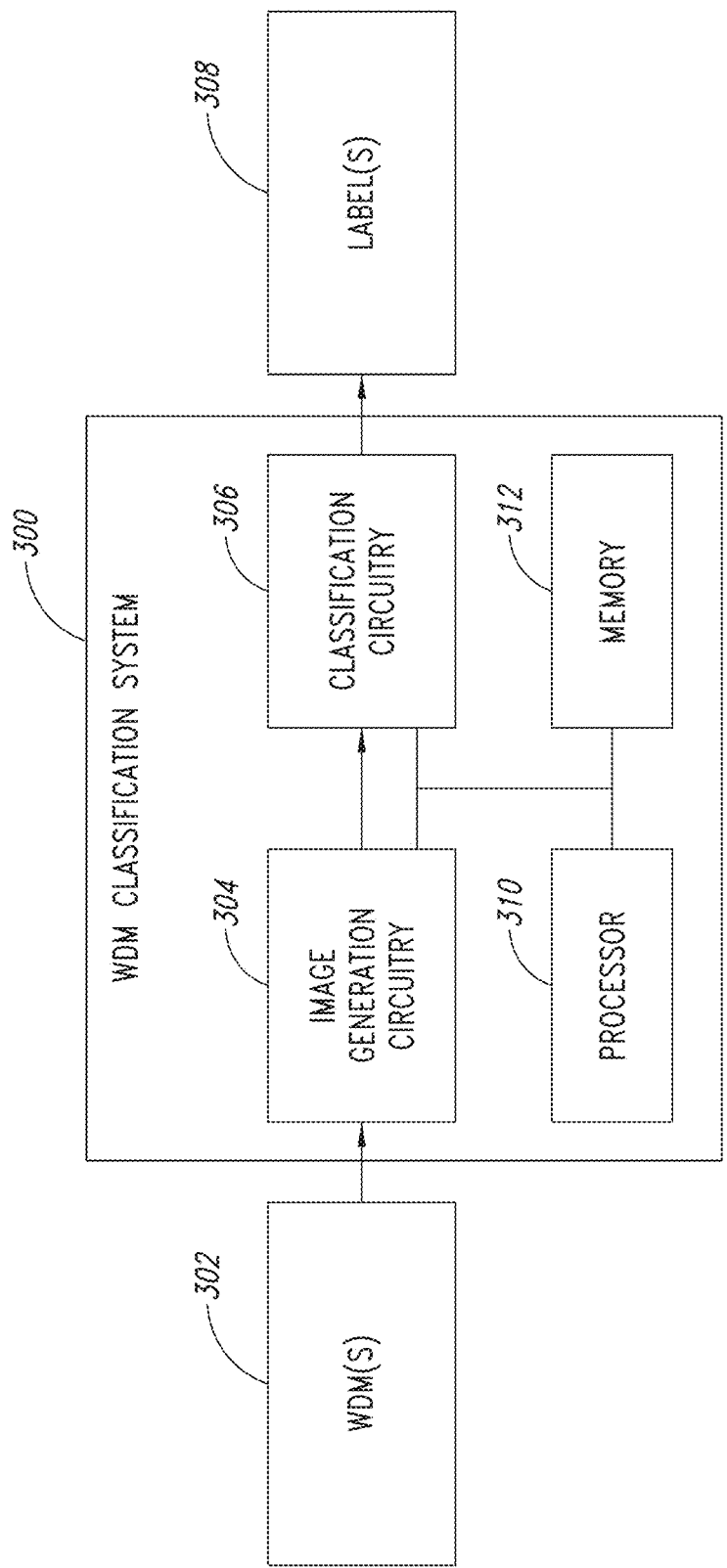
FIG. 3 is a functional block diagram of an embodiment of a WDM classification system.

FIG. 3 illustrates an embodiment of a wafer defect map classification system 300 which automatically classifies wafer defect maps. The system 300 receives a set of WDMs 302 as an input. In a training phase, the set of WDMs 302 have labels (e.g., generated by visual inspection of the WDMs), and tags (e.g., generated in view of the labels and analysis of the particular production process). Image generation circuitry 304 generates a set of digital images from the set of WDMs 302, and in the training phase and a testing phase, may oversample or augment the WDMs. The augmentation may occur prior to generating the set of digital images, which facilitates avoiding distortions that may occur if the augmentation occurred after the image generation process (e.g., if binned image data was augmented). The set of digital images is analyzed by classification circuitry 306, which may comprise, for example, a deep CNN. During the training phase, a data driven model is learned by the classification circuitry 306. During a test or a use phase, a set of labels and tags 308 which have best match to the set of WDMs 302 according to the data-driven model is output by the classification circuitry 306. In some embodiments, the set of tags may be output, while the set of labels is used internally by the CNN (e.g., to determine a tag associated with a training WDM best matching an input WDM). As illustrated, the system 300 comprises one or more processors 310, one or more memories 312, which may be used to implement the functionality of the image generation circuitry 304 and the classification circuitry 306. The system 300 as illustrated also comprises one or more bus systems 314, and may additional circuitry, such as power supplies, interfaces, etc., which are omitted for ease of illustration.

Figure 4:
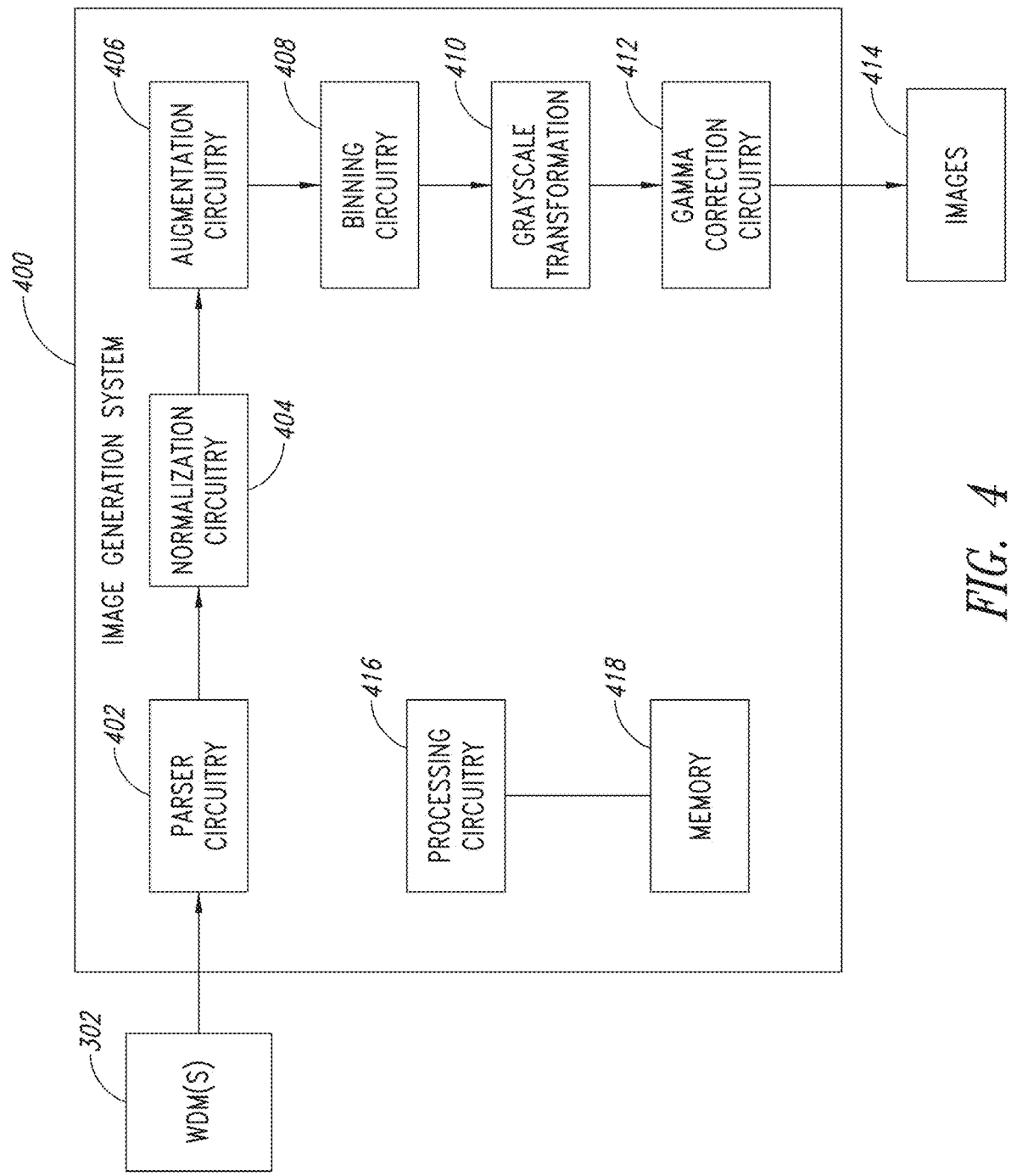
FIG. 4 is a functional block diagram of an embodiment of a WDM image generation system.

FIG. 4 illustrates an embodiment of an image generation system 400, which may be employed, for example, as the image generation circuitry 304 in an embodiment of the WDM classification system 300 of FIG. 3. The image generation system 400 as illustrated includes parser circuitry 402, normalization circuitry 404, augmentation circuitry 406, binning circuitry 408, grayscale transform circuitry 410, and gamma correction circuitry 412. The system 400 receives a set of WDMs 302 as an input and outputs a set of images 414. As illustrated, the system 400 comprises processing circuitry such as one or more processors 416, and one or more memories 418, which may be used to implement the functionality of the parser circuitry 402, normalization circuitry 404, augmentation circuitry 406, binning circuitry 408, grayscale transform circuitry 410 and gamma correction circuitry 412. The system 400 as illustrated also comprises one or more bus systems 420, and may include additional circuitry, such as power supplies, interfaces, etc., which are omitted for ease of illustration.

In an embodiment, the input set of WDMs 302 contains a set of text files in which the coordinates of defects are stored (e.g., klarf files). The parser circuitry 402, in operation, opens the text files and produces a set of comma separated value (csv) files. The set of csv files may preserve the context information.

The normalization circuitry 404, in operation, normalizes the coordinates with respect to the center of the wafer, and with respect to the radius of the wafer. For example the following relationships may be employed to generate normalized coordinates $x'$, $y'$ from the input coordinates, $$x = (x_{index} \cdot x_{die} + x_{rel}) - x_c$$

$$y = (y_{index} \cdot y_{die} + y_{rel}) - y_c$$

$$x' = x/\text{radius}$$

$$y' = y/\text{radius}$$

where $x_{index}$ and $y_{index}$ are the number of dies to count in the horizontal and vertical directions from a die that contains the center of the wafer; $x_{rel}$, $y_{rel}$ are defect coordinates with respect to a bottom-left point of a die identified by $x_{index}$, $y_{index}$; $x_{die}$, $y_{die}$ are the size of the die (width, height), and can be viewed as a die pitch; and $x_c$, $y_c$ are the coordinates of the center with respect to a bottom-left point of the die containing the center.

Normalization facilitates classifying WDMs of wafers of various sizes in a manner which does not need to consider the size of the wafer or the resolution of the WDM.

The augmentation circuitry 406, is used in the training and testing phases, and, in operation, generates artificial but plausible WDMs from the input set of training WDMs (e.g., with the normalized coordinates). Data augmentation facilitates avoiding overfitting, over-prediction of the dominant class and imbalanced datasets. In an embodiment, transforms may be employed to generate fictitious WDMs. The transforms employed preserve the labels and tags. In an embodiment, invariant characteristics of wafers are exploited to select specific WDM transforms which preserve the information in the WDM used to classify the WDMs (e.g., information corresponding to the label and root cause). Transforms such as rotations, symmetries, flips, shifts, etc., may be performed and may be selected, for example, based on the class of the source WDM. For example, a rotation may preserve the label and information when the root cause is contamination of the clean room, but may not preserve the information when the root cause is misalignment of a particular piece of machinery, etc.

In an embodiment, fictitious random defects (e.g., noise) may be added to the WDMs to generate artificial WDMs for use in training and testing, in addition to, in combination with, or instead of, applying one or more transforms. A set of fictitious random defects may be randomly selected from a plurality of sets of fictitious random defects. A random number of defects may be added, and selected according to an empirically derived distribution. Adding noise to the augmented WDMs facilitates training the classifier using an augmented training set of WDMs having a more realistic distribution of noise.

In an embodiment, a coordinate set D may be transformed into a new coordinate set $D'=M \cup \eta$ according to the transform M:

$$M = \begin{bmatrix} \cos(\vartheta) & \sin(\vartheta) & t_x \\ s \cdot \sin(\vartheta) & s \cdot \cos(\vartheta) & t_y \\ 0 & 0 & 1 \end{bmatrix}$$

where $\eta$ is a set of fictitious random defects added to the coordinate set D, and $\eta$, s, $t_x$, $t_y$, and $\vartheta$ are chosen randomly. For example, the distribution of defects in a normal class may be considered to understand what can be considered background, e.g., present in all classes despite the presence of a real pattern error. Then set of candidates for $\eta$ may be generated based on the derived distribution.

In an embodiment, individual matrixes may be employed to generate artificial, but likely variations of a WDM based on random rotations, symmetries and translations. For example, a rotation matrix R may be employed:

$$R = \begin{bmatrix} \cos(\vartheta) & \sin(\vartheta) & 0 \\ \sin(\vartheta) & \cos(\vartheta) & 0 \\ 0 & 0 & 1 \end{bmatrix}$$

where a random rotation angle $\vartheta$ is uniformly chosen between 0 and 360 degrees except for incomplete and grid classes where the rotation angle may be chosen as a random multiple of 90 degrees since in these cases the orientation of the pattern may be fixed.

A scaling matrix S may be employed to introduce a random flip:

$$S = \begin{bmatrix} 1 & 0 & 0 \\ 0 & \sigma & 0 \\ 0 & 0 & 1 \end{bmatrix}$$

A chance of a random flip may be uniformly chosen between 0 and 1, and the scaling factor $\sigma$ may be -1 or 1, depending on whether a flip is randomly chosen.

A random vector $(t_x, t_y)$ may, for example, be uniformly chosen in a fixed interval for all classes except for edge patterns, such as the donut, which may be limited to avoid defects that fall outside of the wafer $M=T \cdot S \cdot R$, for example as follows:

$$T = \begin{bmatrix} 1 & 0 & t_x \\ 0 & 1 & t_y \\ 0 & 0 & 1 \end{bmatrix}$$

In an embodiment, oversampling may be employed instead of or in addition to augmentation. For example, oversampling so that each label class has a same number of training samples or so that each root cause has a same number of training samples may be employed.

As illustrated, the image generation system, in operation, performs the augmentation before the binning, which facilitates avoiding distortions that may be introduced by augmenting binned image representations.

As noted above, augmentation may be used in the training and testing phases. In the training phase, for each class, transforms that preserve the specific class label are applied. In the testing phase, the class to which a WDM belongs is not known. Thus, in an embodiment of a testing phase, only transforms which are common to all classes may be applied.

The binning circuitry 408, in operation, quantizes the WDMs into images. Data binning or bucketing is a data process technique used to group continuous input data into a smaller number of bins or intervals of discrete values. The output size depends on how many bins are employed. More bins means that a region considered for each bin is smaller. Binning may facilitate reducing the amount of data to be processed by the classification circuitry (see classification circuitry 306 of FIG. 3) and may the size of the output image. The original data values of a WDM are replaced by a count of defects that fall into a small region, or bin, of the WDM. Fixed binning, where the size of each bin is fixed, or adaptive binning may be employed. In fixed binning, the wafer map may be divided into a uniformly spaced grid.

In adaptive binning, the wafer is split into intervals of different dimensions with the expected value of defects constant in each bin. The size of each bin is inversely proportional to the density of defects and smaller bins are used to describe high-density defect regions of the WDM, which results in higher resolution images. Adaptive binning reflects that defects may be more dense in some regions of the WDMs (e.g., at the center and at the edges), and creates smaller bins where the defect density is higher. A more general solution, which may be applied in an embodiment, is to directly learn the binning layout to maximize the defect-detection performance on a given training set. In an embodiment, the learning problem may be formulated as learning the number of bins or the density values in each bin. Adaptive binning facilitates detecting some types of defects, such as the incomplete class, which may have defects at positions at the wafer borders, such as fixed positions.

Figure 5:
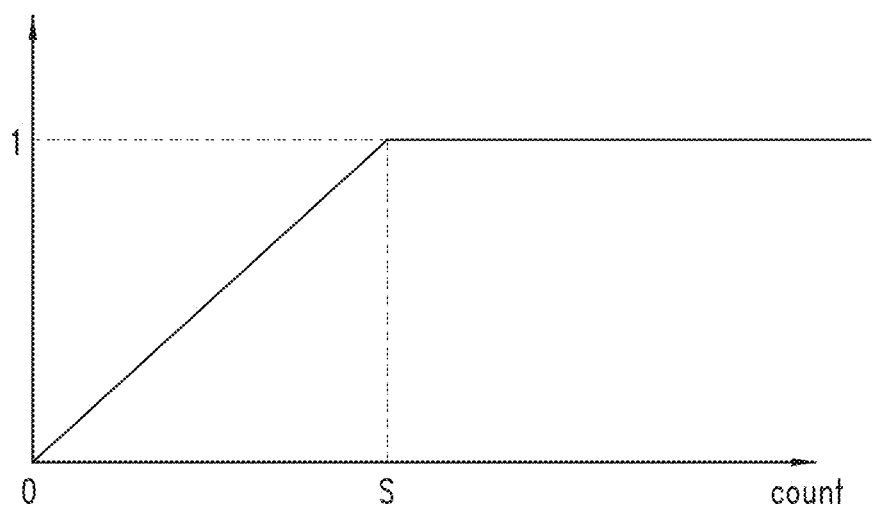
FIG. 5 is a graphical representation of a transform to convert an input bin count value into a greyscale image value in an embodiment.
Figure 6:
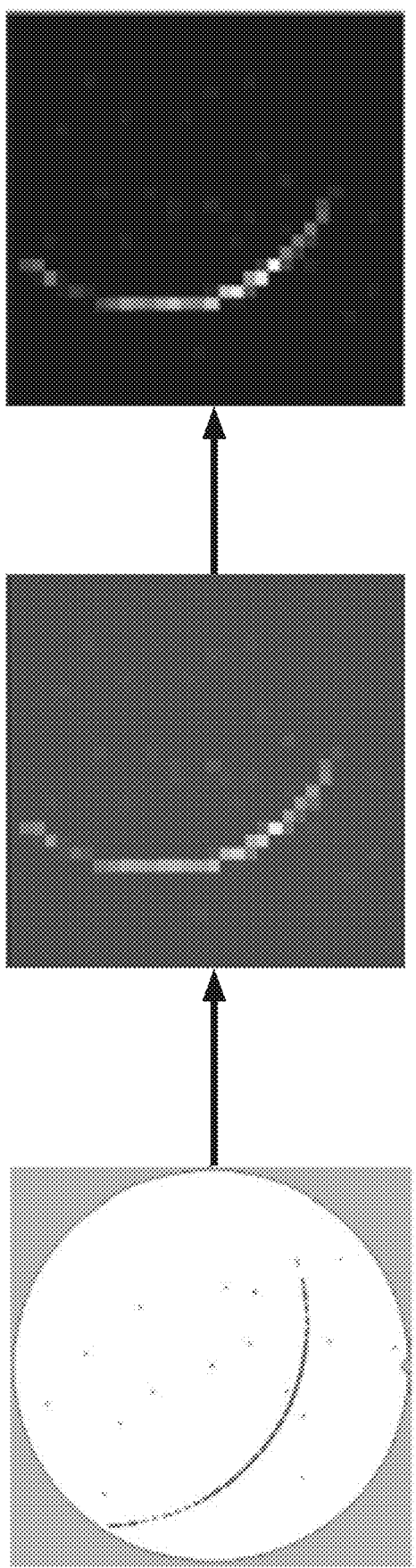
FIG. 6 is a graphical representation of an input WDM, a binned image and a grayscale image.

The grayscale transform circuitry 410, in operation, transforms the image generated by the binning circuitry 408 into a grayscale image with values in the range of [0, 1]. A saturation threshold s is set, for example based on the output size (a number of bits available to represent a bin count). For example, the saturation threshold may be set at 255. Values of an image (e.g., a count value of a bin) generated by the binning circuitry which are above the saturation threshold s are replaced by 1. Values below the saturation threshold s are linearly scaled. The output of the grayscale transformation circuitry is a grayscale image. FIG. 5 is a graphical representation of a transform to convert an input bin count value into a greyscale image value in an embodiment. FIG. 6 is a graphical representation of converting an input WDM into a binned image and generating a grayscale image from the binned image.

The gamma correction circuitry 412 enhances the contrast by, in operation, applying a transform to each value. For example, the following transform may be applied:

$$V = v V^{\Upsilon}, \Upsilon \leq 1$$

where v is a count value of a bin, gamma $\Upsilon$ is a transform parameter, and V is a transformed count value of a bin. In an embodiment, the saturation parameter s and the transform parameter T may be manually selected. In an embodiment, the classifier may learn to select its own thresholds. For example, the saturation parameter s may be set to 255, and additional convolutional layers (e.g., two layers) may be added to the CNN so that the model learns a contrast enhancement function. Having the model learn the contrast enhancement function from the data facilitates using different images sizes, as different thresholds do not need to be studied for manual selection using different image sizes.

The output of the image generation system is a set of one or more images, which are provided as an input to a classification system, such as the classification circuitry 306 of FIG. 3.

Embodiments of the image generation system 400 may comprise more or fewer circuits than illustrated, and circuits may be combined and separated into additional circuits in various manners. For example, some embodiments of the image generation system 400 may omit the gamma correction circuitry 412 and image enhancement, if desired, may be performed in a classification system such as the classification circuitry 306 of FIG. 3. Some embodiments may perform image enhancement in both an image generation system and a classification system. In another example, the image generation system 400 may include resampling circuitry instead of or in addition to the augmentation circuitry 406.

Figure 7:
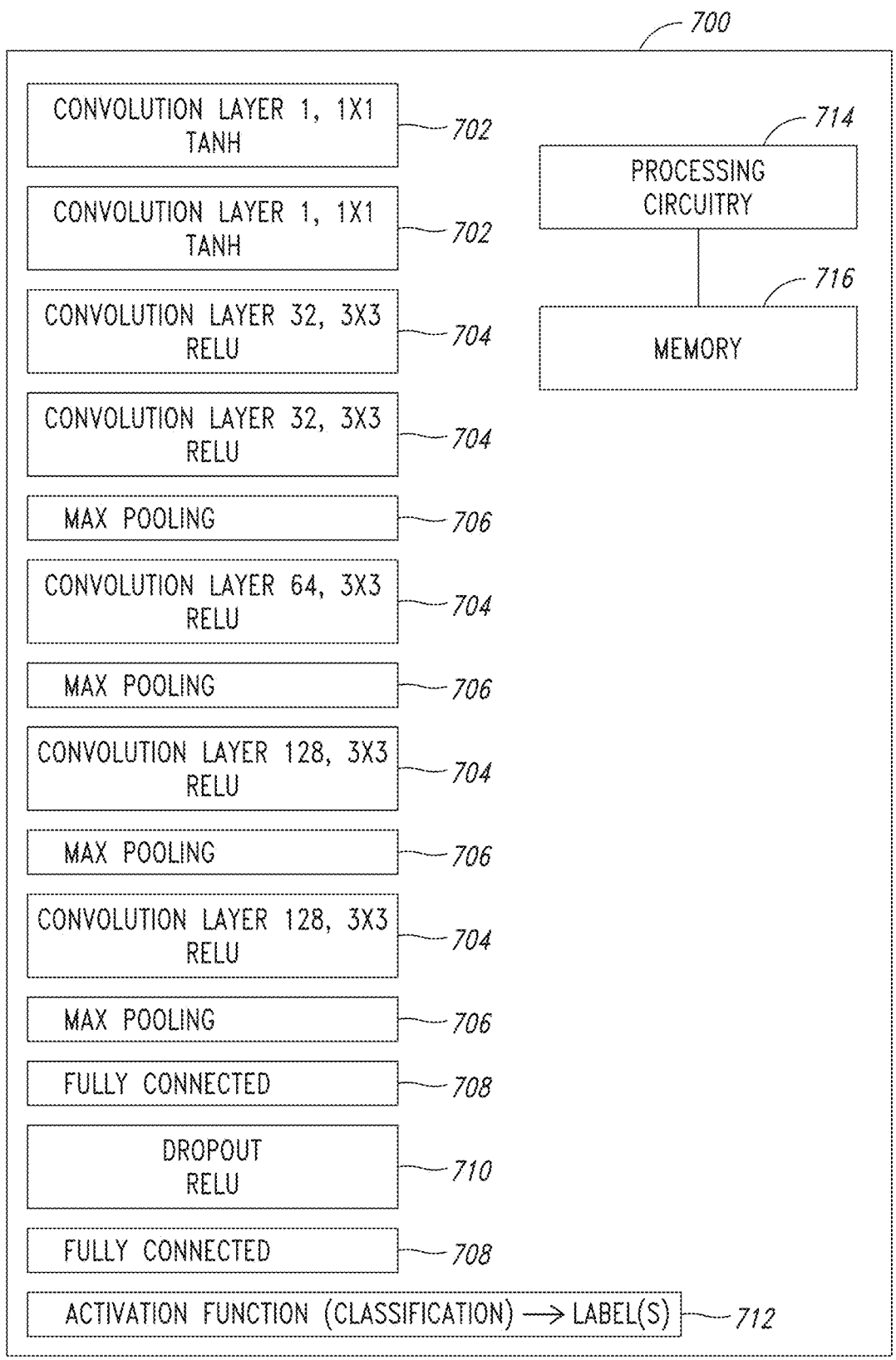
FIG. 7 is a functional block diagram of an embodiment of a WDM image classification system.

FIG. 7 illustrates an embodiment of an image classification system 700, which may be employed, for example, as the classification circuitry 306 in an embodiment of the WDM classification system 300 of FIG. 3. The images classification system 700 may be configured to operate in a plurality of phases, including a training phase, a testing phase and a classification phase. Some embodiments may store a trained model and, in operation, employ only the classification phase.

The image classification system 700 as illustrated comprises a plurality of layers, including contrast enhancement convolutional layers 702, rectified linear unit (Relu) convolutional layers 704, max pooling layers 706, fully connected layers 708, and dropout layers 710, and an activation function 712. The system 700 receives a set of WDMs represented as grayscale images as an input. In a training phase, the WDMs include associated labels and tags. In a testing and classification phase, the WDMs may include some associated tag information, such as the machines used to process the wafer. Typically, in the testing and classification phase, the labels identifying a defect class and the tag information identifying a root defect cause would be missing. In the training phase, the WDM classification system 700 generates a data driven model mapping input WDMs to labels identifying classes and, in some embodiments, to tags associated with root defect causes. In the testing and classification phases, the WDM classification system 700 outputs a set of labels and tags associated with the input WDMs. As illustrated, the system 700 comprises processing circuitry 714, and one or more memories 716, which may be used to implement the functionality of the layers of the WDM classification system 700. The system 700 as illustrated also comprises one or more bus systems 718, and may include additional circuitry, such as power supplies, interfaces, etc., which are omitted for ease of illustration.

A convolutional layer comprises a small matrix sliding over an input image. The contrast enhancement convolutional layers 702 include a hyperbolic tangent unit. As illustrated, the contrast enhancement layers in operation have a kernel of size 1×1, and a dimensionality of an output space of 1 (e.g., a number of output filters in the convolution is one), and enhance the contrast of the input WDM images and accelerate the training by introducing non-linearity.

The rectified linear unit (Relu) convolutional layers 704, as illustrated, include a rectified linear unit (Relu), and in operation have a kernel size of 3×3, and respective dimensionalities of an output space of 32, 64 and 128 (e.g., the number of output filters in the convolutions are respectively 32, 64 and 128), and accelerate the training by introducing non-linearity. The max pooling layers 706, in operation, downsample, reducing the parameters and addressing overfitting.

The fully connected layers 708, in operation, connect every neuron in one layer to every neuron in another layer, and determine which features most correlate to one or more particular classes. The fully connected layers 708 receive an input volume (the output of the preceding layer) and output an m-dimensional vector, where m is the number of classes that the model has available to choose from. In the example of FIG. 2, m is twelve. The dropout layer 710, as illustrated, includes a Relu and, in operation, randomly disables some neurons to reduce the risk of overfitting. The last fully connected layer 708 generates a feature vector, which is provided to the activation function 712.

The activation function 712, in operation, may be, for example, a softmax function, in which case an input WDM may be associated to the maximum correlation, or a sigmoid function, in which case an input WDM may be associated to multiple labels (e.g., all the labels having a correlation above a threshold value). The activation function 712, in operation, performs the classification, and outputs a label, which may indicate the class, the root cause, or both.

In a testing phase, each input WDM may be classified multiple times (e.g., 100 times, with different augmentations) with the resulting label(s) being the labels most often selected by the system 700. More control over the selected transforms used for augmentation may be employed in the testing phase than in the training phase. Testing of an embodiment showed the trained model accurately predicted the true label for most classes more than 90% of the time, and for all classes more than 80% of the time.

Embodiments of the system 700 may comprise more or fewer layers and circuits than illustrated, and layers and circuits may be combined and separated into additional layers and circuits in various manners. For example, some embodiments of the system 700 may omit the image enhancement convolutional layers 702, and image enhancement, if desired, may be performed in an image generation system such as the system 400 of FIG. 4. In another example, other types of pooling layers may be employed, such as average pooling layers.

Figure 8:
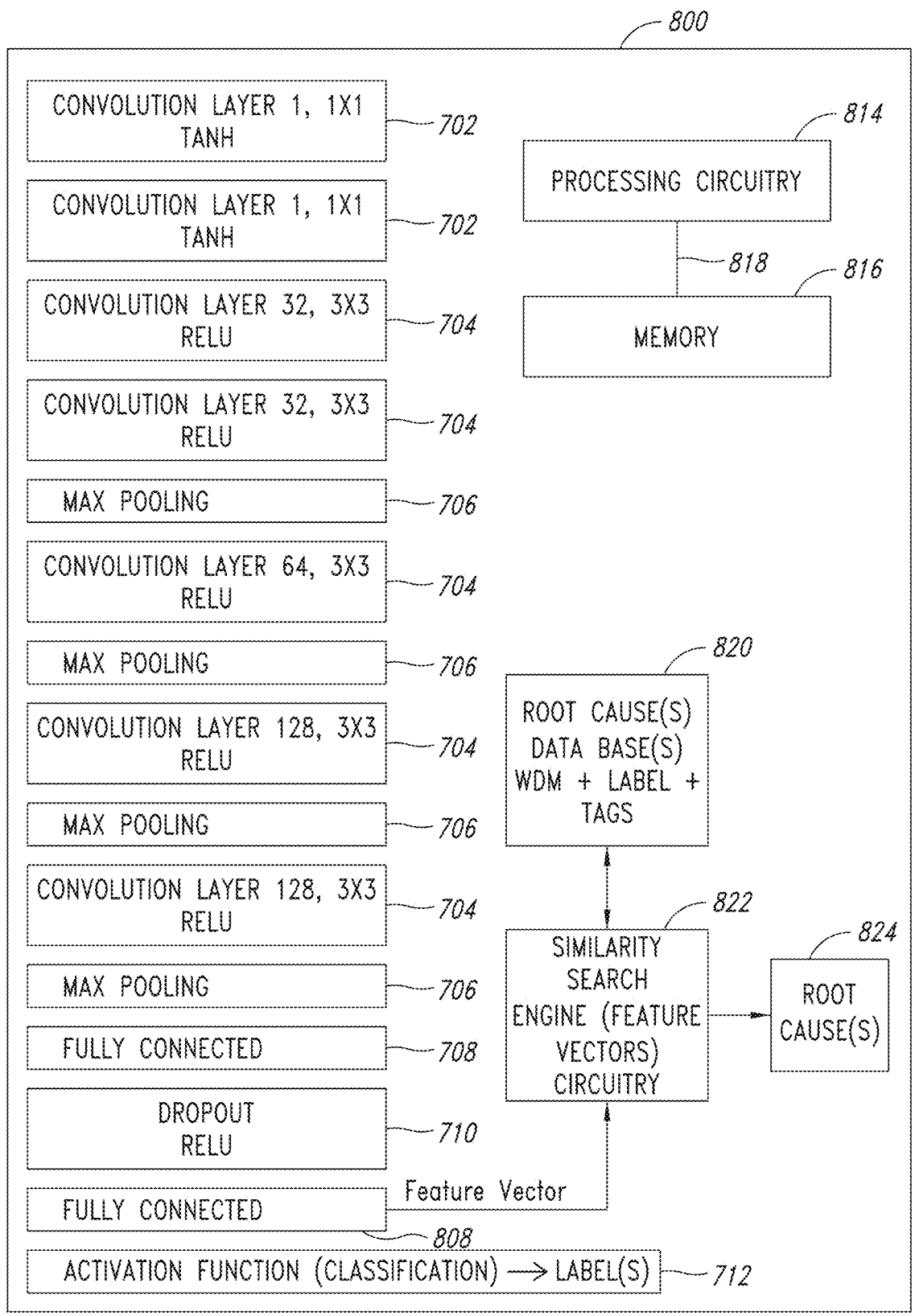
FIG. 8 is a functional block diagram of an embodiment of a WDM image classification system.

FIG. 8 illustrates another embodiment of an image classification system 800, which may be employed, for example, as the classification circuitry 306 in an embodiment of the WDM classification system 300 of FIG. 3. The images classification system 800 may be configured to operate in a plurality of phases, including a training phase, a testing phase and a classification phase. Some embodiments may store a trained model and, in operation, employ only the classification phase. The image classification system 800 is similar to the image classification system 700 of FIG. 7, and the same references numbers are used for similar elements. In the interest of brevity, descriptions of similar elements may be omitted. As illustrated, the system 800 comprises processing circuitry 814, and one or more memories 816, which may be used to implement the functionality of the functionality of the layers and circuitry of the WDM classification system 800. The system 800 as illustrated also comprises one or more bus systems 818, and may include additional circuitry, such as power supplies, interfaces, etc., which are omitted for ease of illustration.

In operation, an image associated with a WDM generated during a production process is provided to the system 800, such as a grayscale image. A feature vector generated in the last fully connected layer 808 is provided to similarity search engine circuitry 822. The similarity search engine 822, in operation, identifies one or more root causes stored in a root causes database, which stores feature vectors, labels and tags associated with WDMs, based on the generated feature vector provided by the last fully connected layer 808. The similarity search engine may use efficient search routines, such as a k-nearest-neighbors search routine which searches a data structure such as a k-dimension tree or a fast library for approximate nearest neighbors (FLANN). The root causes database may be separate from a training database that stores supervised WDM with associated labels identifying the class, and may be populated during the training phase and updated without modifying the training database. For example, root cause tags that are no longer pertinent (e.g., when equipment is removed from the production line) may be removed from the root causes database without modifying the CNN.

Figure 9:
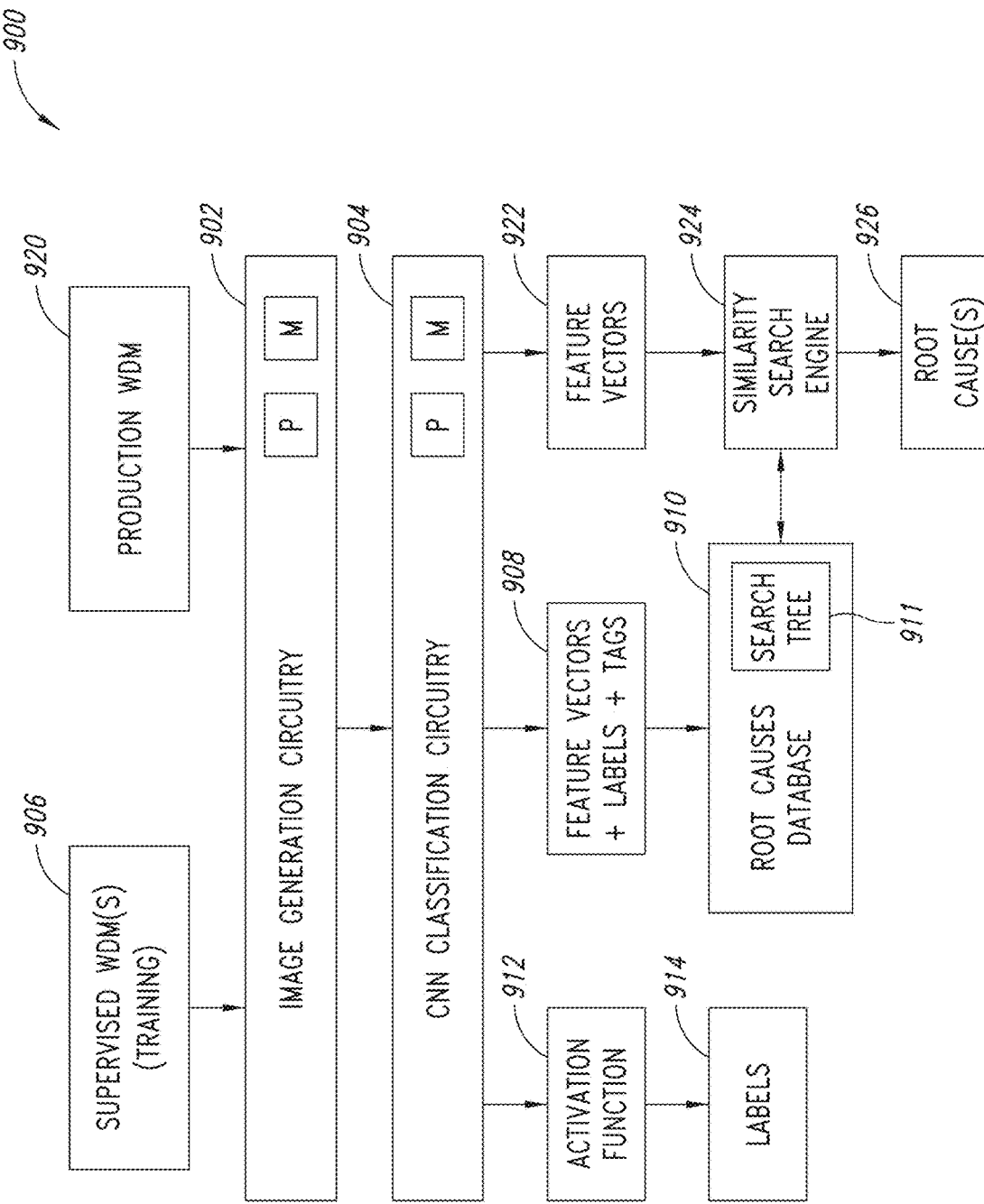
FIG. 9 is a functional block diagram of an embodiment of a WDM classification system.

FIG. 9 is a functional block diagram of an embodiment of a WDM classification system 900. The system 900 includes image generation circuitry 902 and CNN classification circuitry 904. As illustrated, the image generation circuitry 902 and the CNN classification circuitry 904 each include processing circuitry P and one or more memories M, which in operation may implement the functionality of the image generation circuitry 902 and the CNN classification circuitry 904. In an embodiment, the functionality of the image generation circuitry 902 and the CNN classification circuitry may be implemented by a single processing system.

In a training mode of operation of the system 900, the image generation circuitry 902 receives a set of supervised WDMs 906 with associated labels and tags, and, in operation, generates a set of training images, such as a set of grayscale images, which are provided to the CNN classification circuitry 904. The set of training images may be an augmented set of training images. The CNN classification circuitry, in operation, learns a data-driven model to associate WDMs with defect classes, generates feature vectors and tags 908 associated with the supervised WDMs, and stores the generated feature vectors and tags associated with supervised WDMs in a root causes database 910. The root causes database may include one or more search trees 911, which in operation, facilitate searching of the root causes database. The supervised WDMs associated with the feature vectors may include augmented WDMs.

In a classification mode of operation, the image generation circuitry 902 receives a WDM 920 associated with production of a wafer for classification, and, in operation, generates an image representing the WDM 920, such as a grayscale image, which is provided to the CNN classification circuitry 904. The CNN classification circuitry, in operation, applies the data-driven model to generate one or more feature vectors 922 associated with the WDM 920. The similarity search engine 924 determines one or more root causes 926 associated with the WDM 920 by searching the root causes database 910 based on the one or more feature vectors 922. As illustrated, the CNN classification circuitry 904 also executes an activation function 912, which in operation generates one or more labels 914 associated with the WDM 920, which indicated a predicted defect class associated with the WDM 920.

Figure 10:
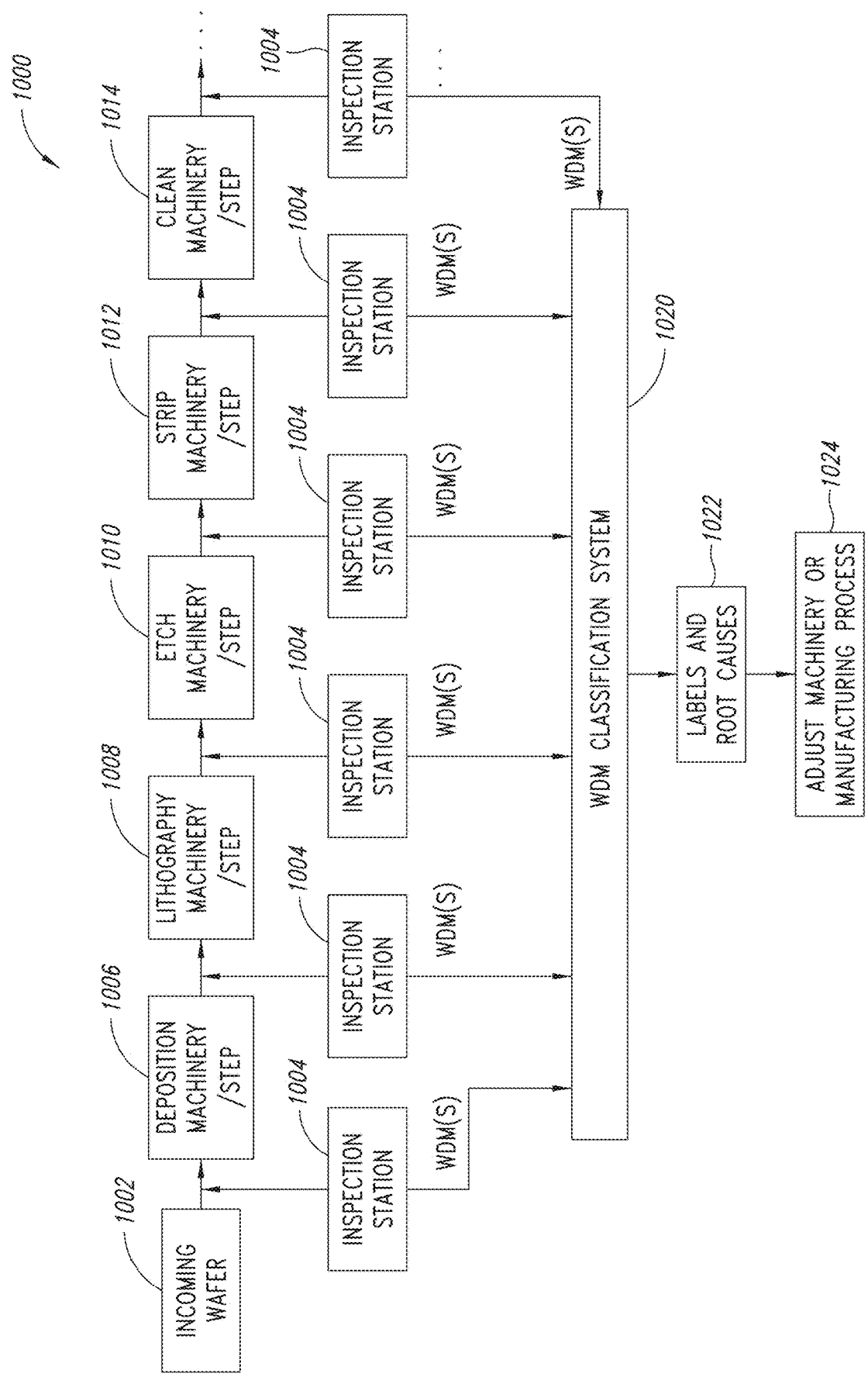
FIG. 10 is a functional block diagram of an embodiment of a wafer manufacturing system.

FIG. 10 is a functional block diagram of an embodiment of a wafer manufacturing system or process 1000. An incoming wafer 1002 is received by the system 1000. An inspection station 1004, which may comprise one or more images sensors, and which, in operation, generates one or more WDMs of the incoming wafer 1002. The wafer is received by deposition machinery 1006, which, in operation, performs a deposition process on the wafer 1002.

After the deposition process, the wafer 1002 is examined by an inspection station 1004, which may comprise one or more images sensors, and which, in operation, generates one or more WDMs of the wafer 1002. The wafer is received by lithographic machinery 1008, which, in operation, performs a lithographic process on the wafer 1002.

After the lithographic process, the wafer 1002 is examined by an inspection station 1004, which may comprise one or more images sensors, and which, in operation, generates one or more WDMs of the wafer 1002. The wafer is received by etch machinery 1010, which, in operation, performs an etching process on the wafer 1002.

After the etching process, the wafer 1002 is examined by an inspection station 1004, which may comprise one or more images sensors, and which, in operation, generates one or more WDMs of the wafer 1002. The wafer is received by stripping machinery 1012, which, in operation, performs a stripping process on the wafer 1002.

After the stripping process, the wafer 1002 is examined by an inspection station 1004, which may comprise one or more images sensors, such as one or more digital image sensors, and which, in operation, generates one or more WDMs of the wafer 1002. The wafer is received by cleaning machinery 1014, which, in operation, performs a cleaning process on the wafer 1002.

After the cleaning process, the wafer 1002 is examined by an inspection station 1004, which may comprise one or more images sensors, and which, in operation, generates one or more WDMs of the wafer 1002. Further processing of the wafer may occur, with examination by additional inspection stations.

The WDMs generated by the inspection stations 1004 are received by a WDM classification system 1020, such as the WDM classification system 300 of FIG. 3 or the WDM classification system 900 of FIG. 9, which in operation generates an output 1022 including labels identifying a defect class or classes of the WDM, and indications of predicted root causes of any defects associated with the WDMs of the wafer 1002. The output 1022 including the labels and predicted root causes may be used by the system 1000 in an adjustment controller or operation 1024 to adjust machinery in the system 1000, to alter the manufacturing process, to suspend the manufacturing process, etc.

The specific machinery and processes of FIG. 10 were selected for purposes of illustration of an embodiment. Additional, fewer and other machinery and processes may be employed in various combinations and orders. In addition, while separate inspection stations 1004 are illustrated for each machine and process, a single inspection station may inspect wafers between multiple manufacturing processes.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    image generation circuitry, which, in operation, generates a binned representation of a wafer defect map (WDM); and
    convolutional-neural-network (CNN) circuitry, which, in operation, generates and outputs an indication of a root cause of a defect associated with the WDM based on the binned representation of the WDM and a data-driven model associating WDMs with classes of a defined set of classes of wafer defects, wherein, the CNN circuitry, in operation,
    generates a feature vector associated with the WDM based on the binned representation of the WDM and the data-driven model; and
    searches a root cause database based on the generated feature vector to generate the indication of the root cause of the defect associated with the WDM, wherein the root cause database stores feature vectors and associated labels and tags of WDMs of a set of training WDMs, a label identifies a class of the defined set of classes and a tag identifies a root cause of a defect.

2. The device of claim 1 wherein a tag identifies a machine associated with the root cause.

3. The device of claim 1 wherein a feature vector stored in the database is associated with one or more labels and one or more tags.

4. The device of claim 1 wherein the searching comprises executing a k-nearest-neighbors search routine which searches one of a k-dimension tree and a fast library for approximate nearest neighbors (FLANN).

5. The device of claim 1 wherein the CNN circuitry includes one or more layers which, in operation, enhance a contrast of the binned representation of the WDM.

6. The device of claim 1 wherein the CNN circuitry includes one or more layers which, in operation, introduce a non-linearity.

7. The device of claim 1 wherein the CNN circuitry includes one or more pooling layers.

8. The device of claim 1 wherein the CNN circuitry includes one or more drop-out layers.

9. The device of claim 1 wherein the CNN circuitry includes one or more fully connected layers.

10. The device of claim 1 wherein the CNN circuitry includes an activation function, which, in operation, generates a label identifying a class of the defined set of classes associated with the WDM based on the feature vector and the data-driven model.

11. The device of claim 1 wherein, in a training mode of operation,
    the image generation circuitry generates a set of binned WDM representations based on a set of supervised WDMs; and
    the CNN circuitry generates the data-driven model associating WDMs with classes of the defined set of classes of wafer defects based on the set of binned WDM representations.

12. The device of claim 11 wherein the image generation circuitry augments the set of supervised WDMs.

13. The device of claim 12 wherein the image generation circuitry augments the set of supervised WDMs prior to generating the set of binned WDM representations.

14. The device of claim 13 wherein the image generation circuitry applies a grayscale transform to the set of binned WDM representations.

15. The device of claim 1 wherein the image generation circuitry, in operation, applies a grayscale transform to the binned representation of the wafer defect map.

16. A device, comprising:
    image generation circuitry, which, in operation, generates a binned representation of a wafer defect map (WDM); and
    convolutional-neural-network (CNN) circuitry, which, in operation, generates and outputs an indication of a root cause of a defect associated with the WDM based on the binned representation of the WDM and a data-driven model associating WDMs with classes of a defined set of classes of wafer defect, wherein, in a training mode of operation,
    the image generation circuitry:
        parses a set of supervised WDMs;
        normalizes the parsed set of supervised WDMs, generating a normalized set of WDMs;

augments the set of normalized WDMs, generating an augmented set of supervised WDMs;

generates a set of binned WDM representations based on the augmented set of supervised WDMs; and applies a grayscale transform to the set of binned WDM representations, generating a set of grayscale WDM images; and the CNN circuitry generates the data-driven model associating WDMs with classes of the defined set of classes of wafer defects based on the set of grayscale WDM images.

17. The device of claim 16, wherein, the CNN circuitry, in operation, generates a feature vector associated with the WDM based on the binned representation of the WDM and the data-driven model; and searches a root cause database based on the generated feature vector to generate the indication of the root cause of the defect associated with the WDM, wherein the root cause database stores feature vectors and associated labels and tags of WDMs of a set of training WDMs, a label identifies a class of the defined set of classes and a tag identifies a root cause of a defect.

18. The device of claim 16 wherein the CNN circuitry includes an activation function, which, in operation, generates a label identifying a class of the defined set of classes associated with the WDM based on the feature vector and the data-driven model.

19. The device of claim 16 wherein the data driven model associates WDMs with root causes of wafer defects and the CNN circuitry includes an activation function, which, in operation, generates a label identifying a class of the defined set of classes associated with the WDM and a tag identifying a root cause associated with the WDM.

20. A device, comprising:

image generation circuitry, which, in operation, generates a binned representation of a wafer defect map (WDM); and convolutional-neural-network (CNN) circuitry, which, in operation, generates and outputs an indication of a root cause of a defect associated with the WDM based on the binned representation of the WDM and a data-driven model associating WDMs with classes of a defined set of classes of wafer defects, wherein the data driven model associates WDMs with root causes of wafer defects and the CNN circuitry includes an activation function, which, in operation, generates a label identifying a class of the defined set of classes associated with the WDM and a tag identifying a root cause associated with the WDM.

21. The device of claim 20 wherein a tag identifies a machine associated with the root cause.

22. The device of claim 20 wherein the CNN circuitry includes one or more layers which, in operation, enhance a contrast of the binned representation of the WDM.

23. A system, comprising:

one or more memories; and wafer-defect-map (WDM) classification circuitry coupled to the one or more memories, which, in operation, generates a binned representation of a WDM; and generates and outputs an indication of a root cause of a defect associated with the WDM based on the binned representation of the WDM and a data-driven model associating WDMs with classes of a defined set of classes of wafer defects, wherein the WDM classification circuitry, in operation, generates a feature vector associated with the WDM based on the binned representation of the wafer-defect map and the data-driven model; and searches a root cause database based on the generated feature vector to generate the indication of the root cause of the defect associated with the WDM, wherein the root cause database stores feature vectors and associated labels and tags of WDMs of a set of training WDMs, a label identifies a class of the defined set of classes and a tag identifies a root cause of a defect.

24. The system of claim 23 wherein, in a training mode of operation, the WDM classification circuitry, generates a set of binned WDM representations based on a set of supervised WDMs; and generates the data-driven model associating WDMs with classes of the defined set of classes of wafer defects based on the set of binned WDM representations.

25. The system of claim 23 wherein, in a training mode of operation, the WDM classification circuitry:

parses a set of supervised WDMs;

normalizes the parsed set of supervised WDMs, generating a normalized set of WDMs;

augments the set of normalized WDMs, generating an augmented set of supervised WDMs;

generates a set of binned WDM representations based on the augmented set of supervised WDMs;

applies a grayscale transform to the set of binned WDM representations, generating a set of grayscale WDM images; and generates the data-driven model associating WDMs with classes of the defined set of classes of wafer defects based on the set of grayscale WDM images.

26. The system of claim 23, comprising a wafer inspection station including one or more digital image sensors.

27. The system of claim 23, comprising:

wafer-production control circuitry, which, in operation, generates one or more control signals to control a wafer-production system based on the indication of the root cause of the defect associated with the WDM.

28. A method, comprising:

generating, using a wafer defect map (WDM) classification system, a binned representation of a WDM; and generating and outputting, using the WDM classification system, an indication of a root cause of a defect associated with the WDM based on the binned representation of the WDM and a data-driven model associating WDMs with classes of a defined set of classes of wafer defects, wherein the generating the indication of the root cause of the defect comprises:

generating a feature vector associated with the WDM based on the binned representation of the wafer-defect map and the data-driven model; and searching a root cause database based on the generated feature vector to generate the indication of the root cause of the defect associated with the WDM, wherein the root cause database stores feature vectors and associated labels and tags of WDMs of a set of training WDMs, a label identities a class of the defined set of classes and a tag identifies a root cause of a defect.

29. The method of claim 28, comprising, in a training mode of operation of the WDM classification system, generating a set of binned WDM representations based on a set of supervised WDMs; and generating the data-driven model associating WDMs with classes of the defined set of classes of wafer defects based on the set of binned WDM representations.

30. A non-transitory computer-readable medium having contents which configure a wafer defect map (WDM) classification system to perform a method, the method comprising:
- generating a binned representation of a WDM; and
- generating and outputting an indication of a root cause of a defect associated with the WDM based on the binned representation of the WDM and a data-driven model associating WDMs with classes of a defined set of classes of wafer defects, wherein the generating the indication of the root cause of the defect comprises:
- generating a feature vector associated with the WDM based on the binned representation of the wafer-defect map and the data-driven model; and
- searching a root cause database based on the generated feature vector to generate the indication of the root cause of the defect associated with the WDM, wherein the root cause database stores feature vectors and associated labels and tags of WDMs of a set of training WDMs, a label identifies a class of the defined set of classes and a tag identifies a root cause of a defect.

31. The non-transitory computer-readable medium of claim 30 wherein the method comprises, in a training mode of operation of the WDM classification system,
- generating a set of binned WDM representations based on a set of supervised WDMs; and
- generating the data-driven model associating WDMs with classes of the defined set of classes of wafer defects based on the set of binned WDM representations.

* * * * *

UNITED STATES PATENT AND TRADEMARK OFFICE
CERTIFICATE OF CORRECTION

PATENT NO. : 10,922,807 B2  
APPLICATION NO. : 16/174022  
DATED : February 16, 2021  
INVENTOR(S) : Lidia Moioli et al.

Page 1 of 1

It is certified that error appears in the above-identified patent and that said Letters Patent is hereby corrected as shown below:

In the Claims

Column 16, Line 62:
"defined set of classes of wafer defect, wherein, in a"
Should read:
--defined set of classes of wafer defects, wherein, in a--.

Column 18, Line 59:
"WDMs, a label identities a class of the defined set of"
Should read:
--WDMs, a label identifies a class of the defined set of--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*